United States Patent
Kaminsky

(10) Patent No.: US 8,381,016 B2
(45) Date of Patent: *Feb. 19, 2013

(54) FAULT TOLERANCE FOR MAP/REDUCE COMPUTING

(75) Inventor: David L. Kaminsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,673

(22) Filed: Feb. 28, 2012

(65) Prior Publication Data

US 2012/0159236 A1     Jun. 21, 2012

Related U.S. Application Data

(62) Division of application No. 12/828,247, filed on Jun. 30, 2010.

(51) Int. Cl.
*G06F 11/00* (2006.01)

(52) U.S. Cl. .......... 714/4.1; 714/4.11; 714/47.1; 714/48

(58) Field of Classification Search ............... 714/1, 2, 714/4, 4.1, 4.11, 25, 47.1, 48
See application file for complete search history.

(56) References Cited

U.S. PATENT DOCUMENTS

2009/0313635 A1* 12/2009 Dasdan .......... 718/105
2010/0122065 A1* 5/2010 Dean et al. .......... 712/203

* cited by examiner

*Primary Examiner* — Scott Baderman
*Assistant Examiner* — Sarai Butler
(74) *Attorney, Agent, or Firm* — Steven M. Greenberg, Esq.; Carey, Rodriguez, Greenberg & O'Keefe

(57) ABSTRACT

Embodiments of the invention include a method for fault tolerance management of workers nodes during map/reduce computing in a computing cluster. The method includes subdividing a computational problem into a set of sub-problems, mapping a selection of the sub-problems in the set to respective nodes in the cluster, directing processing of the sub-problems in the respective nodes, and collecting results from completion of processing of the sub-problems. During a first early temporal portion of processing the computational problem, failed nodes are detected and the sub-problems currently being processed by the failed nodes are re-processed. Conversely, during a second later temporal portion of processing the computational problem, sub-problems in nodes not yet completely processed are replicated into other nodes, processing of the replicated sub-problems directed, and the results from completion of processing of sub-problems collected. Finally, duplicate results are removed and remaining results reduced into a result set for the problem.

3 Claims, 2 Drawing Sheets

FAULT TOLERANCE FOR MAP/REDUCE COMPUTING

CROSS-REFERENCE TO RELATED APPLICATIONS

This application is a Divisional of U.S. application Ser. No. 12/828,247, filed Jun. 30, 2010, currently pending, the entirety of which is incorporated herein by reference.

BACKGROUND OF THE INVENTION

Field of the Invention

Description of the Related Art

Distributed computing clusters have become common in the field of high-availability and high-performance computing. Specifically, distributed computing clusters have become common because cluster-based systems exhibit three important and fundamental characteristics or properties: reliability, availability and serviceability. Each feature will be understood to be of paramount importance when designing a robust clustered system. Generally, a clustered system consists of multiple application server instances grouped together in a server farm of one or more server computing nodes connected over high-speed network communicative linkages. Further, each application server instance in the application cluster can enjoy access to memory, possibly disk space and the facilities of a host operating system.

Among the many challenges faced by those who manage the capacity and performance of a clustered system is the allocation of network resources for consumption by a particular application or workload. Network resources in a cluster can be managed through agents known as workload managers. The workload managers can optimally assign different network resources within endpoint containers to handle selected workloads in an application. In many cases, workload managers can adjust the assignment of network resources based upon performance metrics measured through systems management components in the clustered system.

Clustered systems provide a natural infrastructure for use in modern Map/Reduce computing—a widely understood parallel programming technique for solving computational problems—those descriptions of computations to be performed by one or more computing resources to produce zero or more results. Of note, Map/Reduce computing can occur in "cloud" computing environments utilizing clustered systems. More particularly, Map/Reduce is a framework for processing huge datasets on certain kinds of distributable problems using a large number of computers (nodes), collectively referred to as a "cloud" or "cluster". Computational processing can occur on data stored either in a file system (unstructured) or within a database (structured). For the uninitiated, cloud computing refers to an Internet-based computing paradigm in which shared resources, software and information are provided to computers and other devices on-demand, much like electricity is provided to consumers over an electricity grid. Access to the resources of the "cloud" are governed by points of entry to the "cloud" that manage the relationship between the resource consumer according to the terms of a service level agreement ("SLA") at a cost tracked on behalf of the consumer.

As it is well known, Map/Reduce has two main components a "Map" step and a "Reduce" step. In the "Map" step, the master node accepts input, chops the input into smaller sub-problems, and distributes those smaller sub-problems to correspondingly different worker nodes. (A worker node may do this again in turn, leading to a multi-level tree structure). The worker node in turn processes that smaller problem, and passes the answer back to its master node. In many cases, each worker node processes multiple sub-problems. Thereafter, in the "Reduce" step, the master node then takes the answers to all the sub-problems and combines them in a way to get the output—the answer to the problem it was originally trying to solve.

One advantage of Map/Reduce is that Map/Reduce allows for distributed processing of the map and reduction operations. Provided each mapping operation is independent of the other, all maps can be performed in parallel—though in practice it is limited either or both of the data source and the number of central processing units (CPUs) near that data. Similarly, a set of 'reducers' can perform the reduction phase—all that is required is that all outputs of the map operation that share the same key are presented to the same reducer, at the same time. While this process can often appear inefficient compared to algorithms that are more sequential, Map/Reduce can be applied to significantly larger datasets than that which "commodity" servers can handle—a large server farm can use Map/Reduce to sort a petabyte of data in only a few hours. The parallelism also offers some possibility of recovering from partial failure of servers or storage during the operation: if one mapper or reducer fails, the work can be rescheduled—assuming the input data are still available.

Even still, Map/Reduce computing over a distributed set of nodes in the "cloud" remains vulnerable to individual node failure where each node performs critical processing. In this regard, for some computational problems such as monte carlo simulations, the failure of a few nodes can be inconsequential. However, for more precise computational problems such as counting, nodal failure can produce an unacceptable result. Therefore, at present the state of each node can be determined by the repetitive pinging of each node in a cluster. Failed nodes can be replaced by new nodes performing the same tasks as those assigned to the failed nodes. Of course, the frequent pinging of the nodes in the network by way of a small polling interval can result in an unacceptable degree of ping traffic placed upon the network.

BRIEF SUMMARY OF THE INVENTION

Embodiments of the present invention address deficiencies of the art in respect to map/reduce computing and provide a novel and non-obvious method, system and computer program product for fault tolerance of a computing cluster in map/reduce. In an embodiment of the invention, a method for fault tolerance management of workers nodes during map/reduce computing is provided for a computing cluster. The method includes subdividing a computational problem into a set of sub-problems, and mapping each of the sub-problems in the set to respective nodes in a computing cluster. The method also includes directing processing of the sub-problems in each of the nodes and collecting results from completion of processing of the sub-problems in each of the nodes.

During a first early temporal portion of processing the computational problem, failed ones of the nodes can be detected and the sub-problems currently being processed by the failed nodes can be re-processed in response to detecting the failed ones of the nodes. Thereafter, sub-problems in nodes not yet completely processed can be replicated into other nodes, processing of the replicated sub-problems can be directed in the other nodes, and the results from completion of processing of sub-problems in each of the other nodes can be collected during a second later temporal portion of processing the computational problem. Finally, duplicate results collected for the replicated sub-problems can be removed and the results can be reduced into a result set for the problem.

In one aspect of the embodiment, a time of completion for processing the sub-problems of the problem over a period of time can be computed and a polling interval can be established during which node failures are detected. Consequently, the first early temporal portion can include all intervals of time in the period of time, each interval of time corresponding to the polling interval, except for a final interval of time in the period of time. Conversely, the second later temporal portion can include the final interval of time in the period of time. Optionally, computing a time of completion for processing the sub-problems of the problem over a period of time includes estimating a time of completion based upon a time requisite to complete processing a sub-problem in a node combined with a number of sub-problems remaining to be completely processed in the nodes divided by a number of nodes processing the sub-problems remaining to be completely processed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for fault tolerance management of workers nodes during map/reduce computing in a computing cluster. In accordance with an embodiment of the invention, a problem submitted for map/reduce processing can be divided into multiple different sub-problems and each of the sub-problems can be mapped to a node in a computational cluster. A computational time to completion for the problem can be determined and a polling interval can be selected for polling the operational status of each of the nodes mapped to a corresponding one of the sub-problems. Thereafter, the nodes assigned sub-problems can commence processing and results from completed ones of the sub-problems in respective ones of the nodes can collect. In this way, the use of polling can be used during non-critical periods of processing when restarting failed nodes is of modest consequence, while polling can be avoided during a final critical period of processing when the risk of a failed node can be remediated through redundancy only during the final critical period.

At each polling interval, the nodes in which processing continues to occur for respective ones of the sub-problems can be monitored for health and failed nodes can be restarted and directed to commence again the processing corresponding ones of the sub-problems. Alternatively, the offending nodes can be removed from service and the processing of the respective ones of the sub-problems can be assigned for processing in respectively different nodes. In either circumstance, the sub-problems of the offending nodes can be re-processed whether within the offending nodes, or in different nodes. Optionally, the computational time to completion can be re-determined periodically based upon observed times to completion of the different sub-problems. When it is determined based upon the computational time to completion for the problem that a final interval prior to completion of the problem has begun, those of the sub-problems yet to complete can be identified, replicated and assigned to one or more different backup nodes. Duplicate results from the replicated nodes can be removed and all of the results from all of the nodes can be reduced into a final result to the problem.

Figure 1:
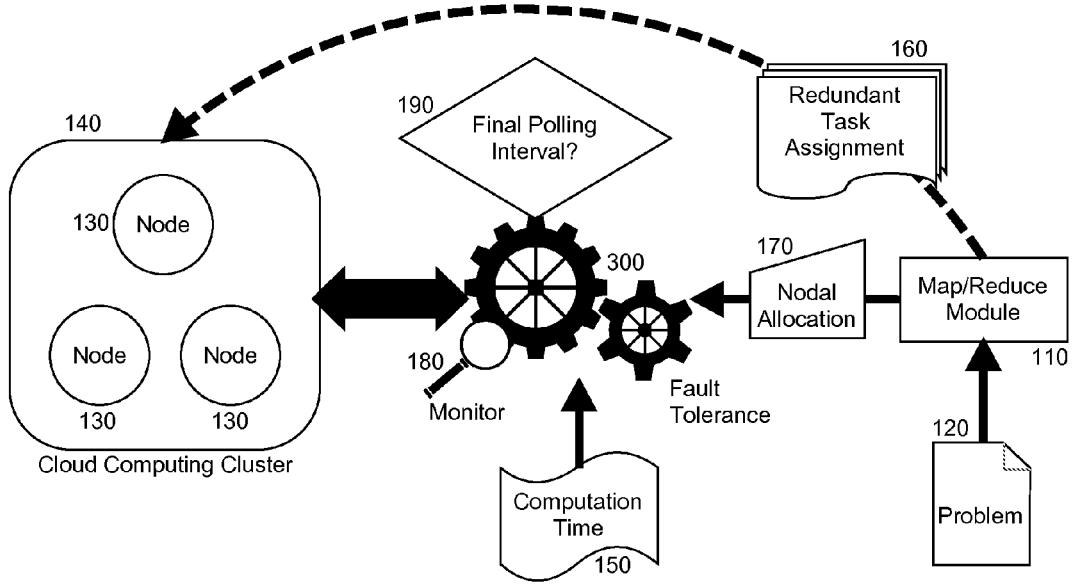
FIG. 1 is a pictorial illustration of a process for fault tolerance management of workers nodes during map/reduce computing in a computing cluster.

In further illustration, FIG. 1 pictorially depicts a process for fault tolerance management of workers nodes during map/reduce computing in a computing cluster. As shown in FIG. 1, a computing cluster 140 of multiple different computing nodes 130 can be provided. A map/reduce module 110 configured to engage in a map/reduce process for a selected computation problem 120, can subdivide the problem 120 into a set of sub-problems and individually assigned to different ones of the nodes 130 in the computing cluster 140 according to a map step of the map/reduce process as part of a nodal allocation 170. The nodal allocation 170 for the sub-problems can be applied to the mapped ones of the nodes 130 and the nodes 130 can be directed to commence computation of respective sub-problems. The results of the computation of the sub-problems can be collected for reduction at the conclusion of computation of all sub-problems of the problem.

Fault tolerance logic 300 can determine a computation time 150 to complete computation of all of the sub-problems and can establish a polling interval at which time the health of each of the nodes 130 computing a corresponding sub-problem can be assessed by way of a monitor 180. For example, the monitor 180 can issue ping directives to each of the nodes 130 in order to confirm the operation of each of the nodes 130. Excepting for a final polling interval 190 prior to completion of computation of the sub-problems, nodes 130 determined to have failed by the monitor 180 can be directed by the fault tolerance logic 300 to re-start the processing of respective sub-problems. Periodically, the fault tolerance logic can re-determine the computation time 150 based upon an observed time to completion for the individual sub-problems so as to estimate a new time to completion for the problem based upon the remaining, incomplete sub-problems.

When it is determined that a final polling interval 190 has commenced, the fault tolerance logic 300 can identify those of the nodes 130 still processing respective sub-problems. In response, the fault tolerance logic 300 can direct the replication of those sub-problems remaining to complete processing. The fault tolerance logic 300 thereafter can direct the processing of the replicants 160 in others of the nodes 130. The results collected subsequent to the replication can be stripped of duplicates and all results of the computation of the sub-problems can be reduced into a final result set for the problem by the map/reduce module 110.

Figure 2:
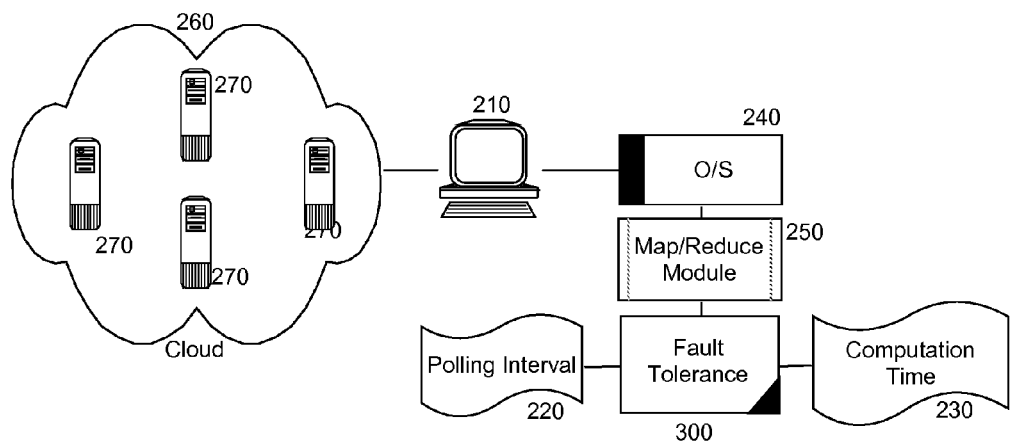
FIG. 2 is a schematic illustration of a computing cluster configured for fault tolerance of worker nodes during map/reduce computing; and, FIG. 3 is a flow chart illustrating a process for fault tolerance management of workers nodes during map/reduce computing in a computing cluster.

The process described in connection with FIG. 1 can be implemented within a clustered data processing system such as that utilizing a cloud computing cluster. In yet further illustration, FIG. 2 is a schematic illustration of a computing cluster configured for fault tolerance of worker nodes during map/reduce computing. The system of FIG. 2 can include a host computer 210 with at least one processor and memory and coupled to a computing cluster 260 of multiple different computing nodes 270 such as complete servers, individual virtual machines executing in one or more servers, or processor cores, to name only a few possibilities. The host computer 210 can include an operating system 240 hosting the execution of a map/reduce module 250 configured to perform both mapping and reduction of a computational problem in accordance with the map/reduce programming model.

Fault tolerance logic 300 can be coupled to the map/reduce module 250. The Fault tolerance logic 300 can include program code enabled to determine a computation time 230 for completion of all of the sub-problems of a problem. Further, the program code can be enabled to establish a polling interval 220 defining a time period when each of the nodes 270 are to be polled to detect failure. Yet further, the program code can be enabled to direct re-starting of any of the nodes 270 thought to have failed prior to a final polling interval before completion of all of the sub-problems of the problem. Finally, the program code can be enabled during the final polling interval to replicate the sub-problems yet to be completed into different nodes 270 and to remove redundant results produced by the replicants.

Figure 3:
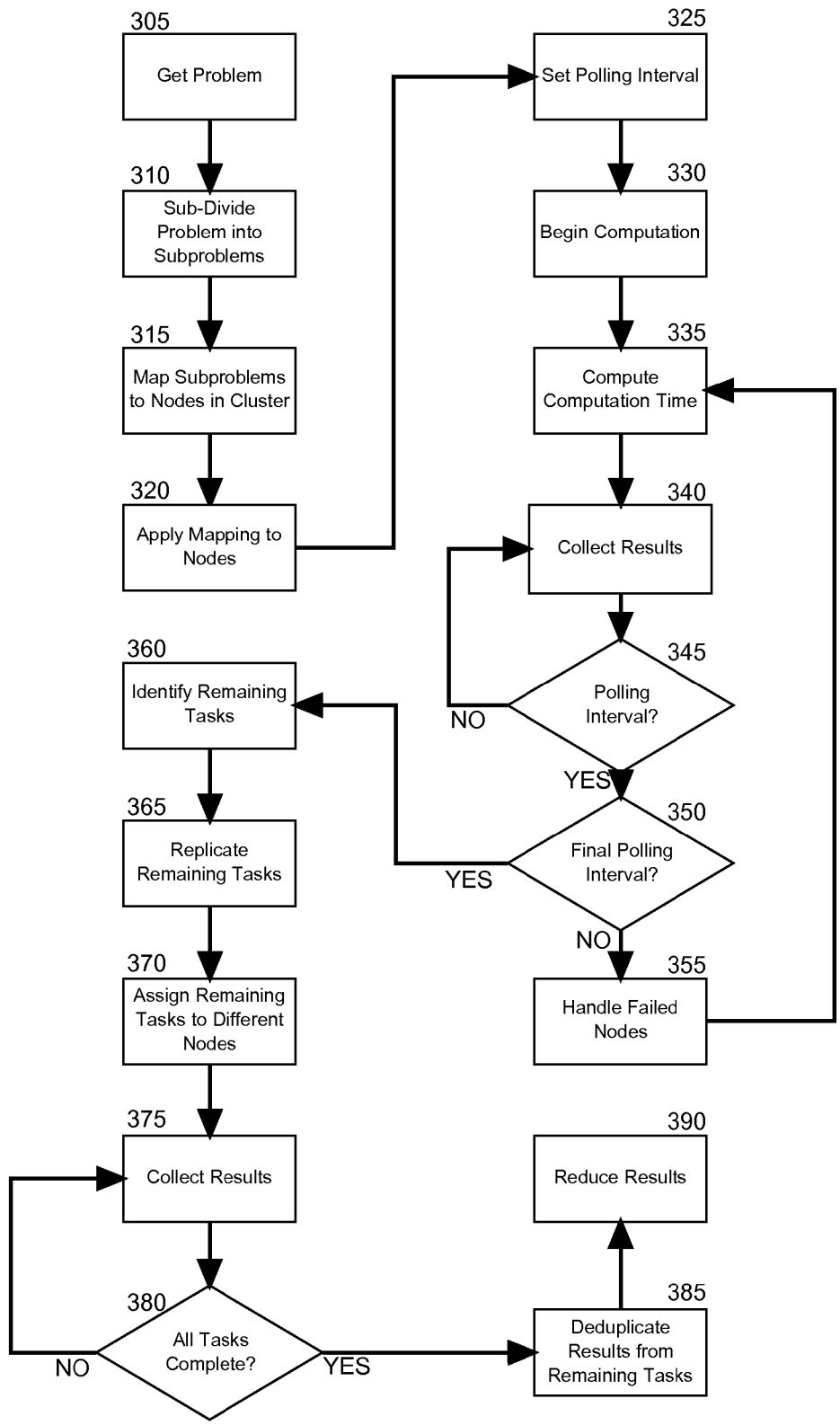

In yet further illustration of the operation of the fault tolerance logic 300, FIG. 3 is a flow chart illustrating a process for process for fault tolerance management of workers nodes during map/reduce computing in a computing cluster. Beginning in block 305, a computational problem can be received in a map/reduce module. In block 310, the problem can be subdivided according to the map/reduce framework and mapped to different nodes in a computing cluster in block 315. In block 320, the mappings set forth by the map/reduce framework can be applied to the nodes of the computing cluster with specific sub-problems assigned for computation with specific nodes. In block 325, a polling interval can be established for the computational problem and in block 330, the computation of each of the sub-problems can commence.

In block 335, an estimated time to complete the computation of the problem can be determined. Initially, the time to complete the computation of the problem can be computed as the amount of time requisite to completing each sub-problem by the number of sub-problems in the problem, divided by the number of nodes mapped to the sub-problems. Over time, empirically the amount of time required to compute a sub-problem can be determined, for example, by computing an average quantity. In block 340, results can be collected from different nodes in which the computation of a mapped sub-problem has completed. In decision block 345, it can be determined if a new polling interval has begun. If not, the results can continue to be collected. Otherwise, the process can proceed through decision block 350.

In decision block 350, it can be determined if the new polling interval is the final polling interval resulting from the computed computation time. If not, failed nodes can be identified and a re-processing of corresponding mapped sub-problems can be directed. Otherwise, if it is determined that the new polling interval is a final polling interval, in block 360, sub-problems remaining to complete processing in corresponding nodes can be identified and those sub-problems can be replicated in block 365 and mapped into different nodes in block 370. In block 375, the results of the remaining and replicated sub-problems can be collected. In decision block 380, if all sub-problems have completed processing, in block 385 duplicate results from each of a remaining and associated replicated sub-problem can be removed and in block 390, the results from all of the sub-problems can be reduced by the map/reduce module to produce a result set for the problem.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for fault tolerance management of workers nodes during map/reduce computing in a computing cluster, the method comprising:
   subdividing a computational problem into a set of sub-problems in a map/reduce module executing in memory by at least one processor of a computer, and mapping a selection of the sub-problems in the set to respective nodes in a computing cluster;
   directing processing of the sub-problems in the respective nodes and collecting results from completion of processing of the sub-problems in the respective nodes;
   determining a computation time to complete computation of all of the sub-problems;
   establishing a polling interval at which time the health of each of the nodes computing a corresponding sub-problem is assessed;
   upon detecting failed nodes during a time period prior to a final polling interval before completion of the computation of all of the sub-problems, restarting the respective sub-problems;
   upon determining that the final polling interval has commenced, identifying nodes still processing respective sub-problems and replicating sub-problems in the identified nodes; and,
   removing duplicate results collected for the replicated sub-problems and reducing the results into a result set for the problem.

2. The method of claim 1, wherein determining a computation time to complete computation of all of the sub-problems, comprises estimating a time of completion based upon a time requisite to complete processing a sub-problem in a node combined with a number of sub-problems remaining to be completely processed in the nodes divided by a number of nodes processing the sub-problems remaining to be completely processed.

3. The method of claim 1, further comprising periodically re-computing the time of completion for processing the sub-problems of the problem.

* * * * *